United States Patent
Nishida

(10) Patent No.: US 10,159,222 B2
(45) Date of Patent: Dec. 25, 2018

(54) LEAD STORAGE APPARATUS

(71) Applicant: DoggyMan H. A. Co., Ltd., Osaka-shi, Osaka (JP)

(72) Inventor: Yasushi Nishida, Osaka (JP)

(73) Assignee: DOGGYMAN H. A. CO., LTD., Osaka (JP)

(*) Notice: Subject to any disclaimer, the term of this patent is extended or adjusted under 35 U.S.C. 154(b) by 220 days.

(21) Appl. No.: 15/063,946

(22) Filed: Mar. 8, 2016

(65) Prior Publication Data

US 2016/0338323 A1 Nov. 24, 2016

(30) Foreign Application Priority Data

May 19, 2015 (JP) ................................. 2015-102297

(51) Int. Cl.
*A01K 27/00* (2006.01)

(52) U.S. Cl.
CPC ................................. *A01K 27/004* (2013.01)

(58) Field of Classification Search
CPC .. A01K 27/004; A01K 27/003; A01K 27/006; A01K 27/007; A01K 27/008; A01K 27/009
USPC ....... 242/229, 238, 286, 304, 306, 307, 308; 119/796, 797, 798, 799
See application file for complete search history.

(56) References Cited

U.S. PATENT DOCUMENTS

| | | | | |
|---|---|---|---|---|
| 1,120,341 A | * | 12/1914 | Smith | B65H 75/4431 242/385.4 |
| 2,217,323 A | * | 10/1940 | Sackett | A01K 27/004 119/796 |
| 2,647,703 A | * | 8/1953 | Hayes | A01K 27/004 119/796 |
| 3,657,491 A | * | 4/1972 | Ryder | B65H 75/4434 191/12.2 R |
| 3,812,307 A | * | 5/1974 | Wagner | H01H 9/0214 191/12.4 |
| 3,853,283 A | * | 12/1974 | Croce | A01K 27/004 119/796 |
| 3,937,418 A | * | 2/1976 | Critelli | A01K 27/004 119/796 |
| 4,846,090 A | * | 7/1989 | Palmquist | B63B 21/16 114/230.23 |

(Continued)

FOREIGN PATENT DOCUMENTS

| | | | | |
|---|---|---|---|---|
| GB | 2481403 A | * | 12/2011 | ........... A01K 27/004 |
| JP | 2009-136213 A | | 6/2009 | |

*Primary Examiner* — Marc Burgess
*Assistant Examiner* — Ebony E Evans
(74) *Attorney, Agent, or Firm* — Westerman, Hattori, Daniels & Adrian, LLP

(57) ABSTRACT

An object of the invention is to provide a lead storage apparatus capable of selecting a lead unreeling range in which the lead can be unreeled and reeled by a user's operation. A lead storage apparatus 10 includes a reel 50, a rotational member 130 having an engaged section 132, an engaging member 70, and a switch member 140 that can restrict rotation of the rotational member 130 with rotation of the reel 50 in a normal direction by engaging an engaging section 74 with the engaged section 132, and switch the lead between a engageable state in which the engaged section 132 can engage with the engaging section 74 and an unengageable state in which the engaged section 132 cannot engage with the engaging section 74.

3 Claims, 14 Drawing Sheets

(56) References Cited

U.S. PATENT DOCUMENTS

| | | | | |
|---|---|---|---|---|
| 4,901,938 | A | * | 2/1990 | Cantley .................. B65H 75/44 242/378.1 |
| 4,989,805 | A | * | 2/1991 | Burke .................... B65H 75/44 242/378.2 |
| 5,094,396 | A | * | 3/1992 | Burke .................... B65H 75/44 242/375 |
| 6,243,921 | B1 | * | 6/2001 | Chang .................... A61J 17/00 24/3.13 |
| 6,619,313 | B2 | * | 9/2003 | Boughton .......... B65H 75/4442 137/355.16 |
| 6,904,872 | B2 | * | 6/2005 | Muller ................. A01K 27/004 119/789 |
| 7,108,216 | B2 | * | 9/2006 | Burke ................ B65H 75/4434 242/378.1 |
| 7,866,282 | B2 | * | 1/2011 | Simpson .............. A01K 27/004 119/781 |
| 7,900,863 | B1 | * | 3/2011 | Cheng ................ B65H 75/4431 242/378.1 |
| 8,251,020 | B2 | * | 8/2012 | Matthews ............ A01K 27/004 119/796 |
| 8,387,763 | B2 | * | 3/2013 | Burke ................ B65H 75/4449 191/12.2 R |
| 8,904,969 | B2 | * | 12/2014 | Chefetz ............... A01K 27/004 119/796 |
| 9,327,938 | B2 | * | 5/2016 | Wilson ............... B65H 75/4402 |
| 9,629,417 | B2 | * | 4/2017 | Cavanagh .............. A43C 11/20 |
| 9,867,430 | B2 | * | 1/2018 | Hammerslag ........ A43C 11/165 |
| 2005/0184186 | A1 | * | 8/2005 | Tsoi .................. B65H 75/4431 242/378.1 |
| 2010/0037832 | A1 | * | 2/2010 | Smith ................. A01K 27/004 119/796 |
| 2015/0076272 | A1 | * | 3/2015 | Trudel .................... A43C 7/00 242/381.4 |

* cited by examiner

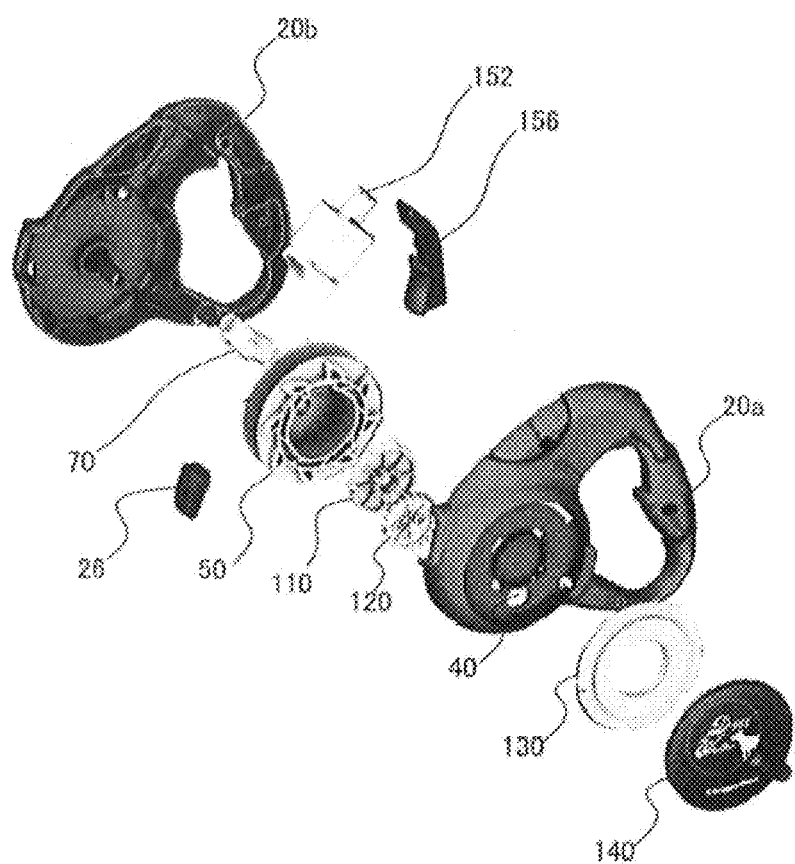

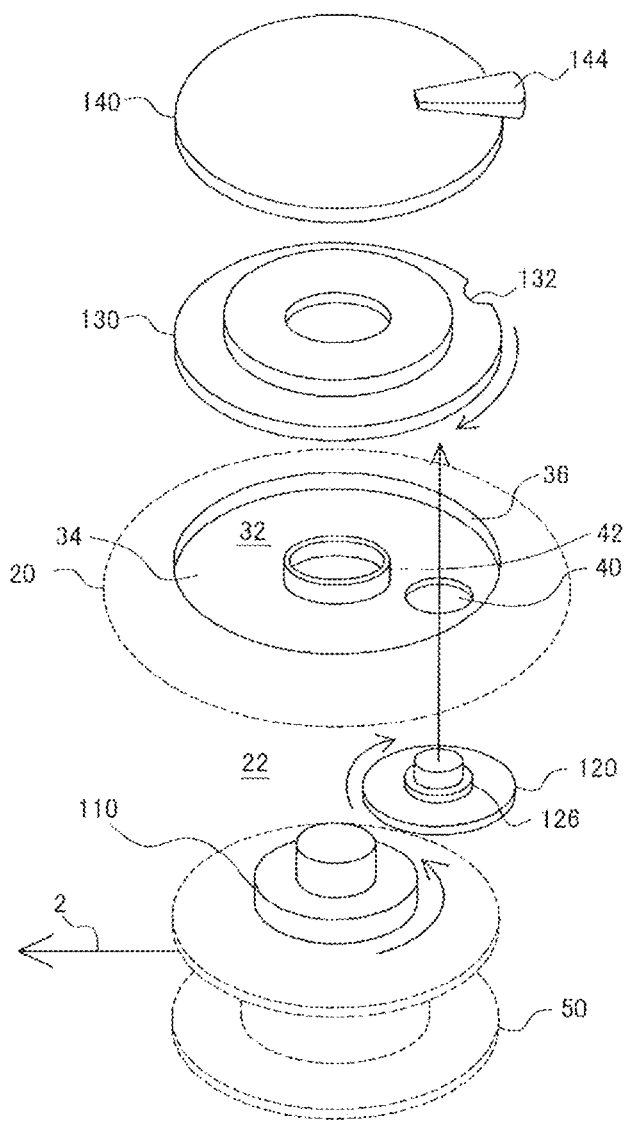

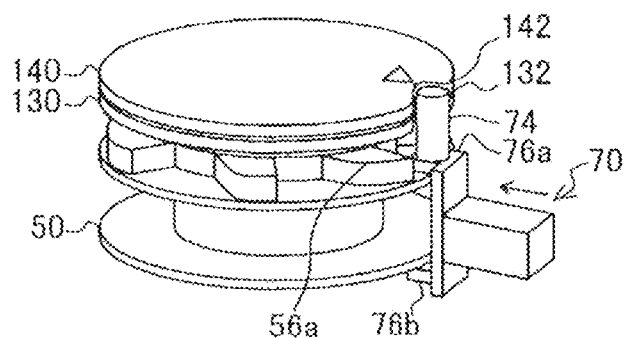
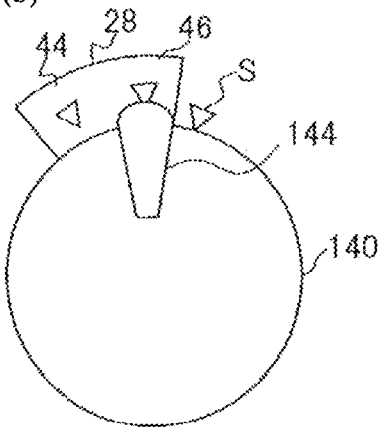
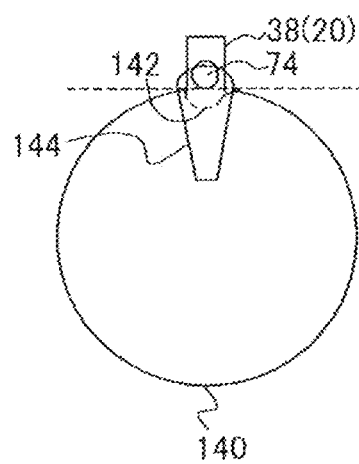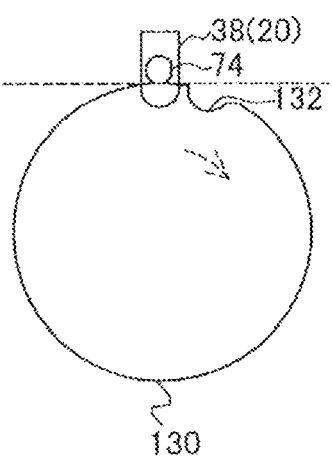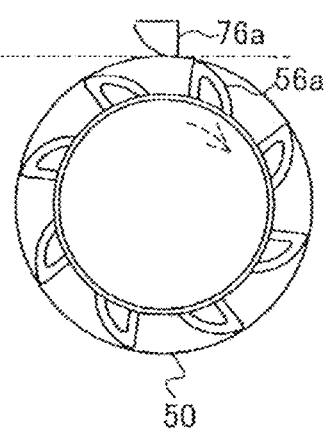
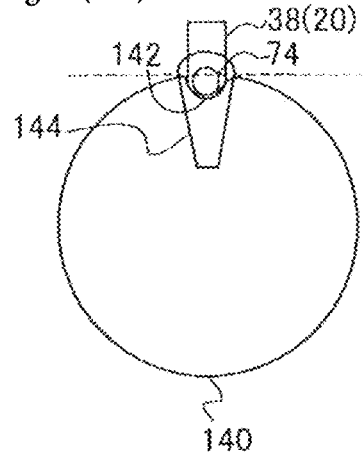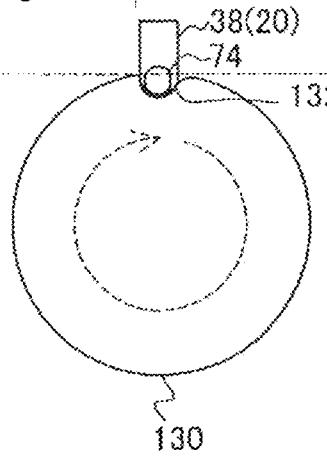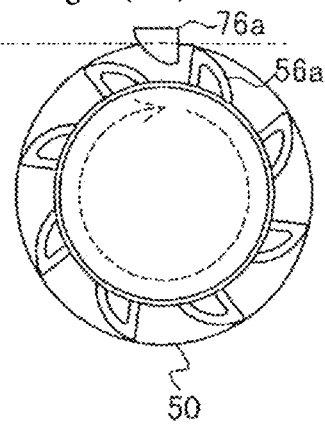

LEAD STORAGE APPARATUS

TECHNICAL FIELD

The present invention relates to a lead storage apparatus capable of reeling and unreeling a pulling cord such as a lead for pet.

A conventional lead storage apparatus for storing a lead used in walking for pets including dogs unreels the lead against a biasing force of a biasing member such as a coil spring, and reels the lead by a stored biasing force. Such lead storage apparatus is configured to unreel the lead by an external force caused by motion of a pet, and reel the lead by the stored biasing force.

A lead storage apparatus described in Patent Document 1 of the Applicant of the present invention stops unreeling and reeling of a lead by the operation of the user while enabling unreeling and reeling of the lead within a lead unreeling limit. The lead storage apparatus in Patent Document 1 enables unreeling and reeling of the lead using a take-up reel, and in the case of an emergency stop of unreeling of the lead, limits unreeling of the lead by means of a lock device.

PRIOR ART DOCUMENTS

Patent Documents

Patent Document 1: Japanese Unexamined Patent Publication No. 2009-136213

DISCLOSURE OF THE INVENTION

Problems to be Solved by the Invention

However, when a pet putting on the lead is active, various situations are assumed. An unreeling distance of the lead means an active range hi which the pet can move. Desirably, the active range can be varied depending on the use environment. For example, the active range may be set large in large space such as a park, but is desirably limited in ordinary roads.

The lead storage apparatus in Patent Document 1 can unreel and reel of the lead in a maximum unreeling range and however, cannot switch the free range in which the lead can be unreeled and reeled between the maximum free range and an intermediate range within the maximum free range.

Thus, an object of the present invention is to provide a lead storage apparatus capable of selecting a lead unreeling free range in which the lead can be freely unreeled and reeled by the user's operation.

Means for Solving the Problems

To attain the above-mentioned object, a lead storage apparatus of the present invention is a lead storage apparatus for storing a lead for an animal such as a pet. The lead storage apparatus includes: a reel that rotates in a normal direction to unreel the lead and rotates in a reverse direction to reel the lead; a biasing member that receives an external force caused by unreeling of the lead and stores a biasing force, and upon release of the external force, biases rotation of the reel in the reverse direction; a rotational member that has an engaged section on its circumference and rotates with the reel; an engaging member that has an engaging section engageable with the engaged section, and is disposed at a predetermined circumferential position with respect to the rotational member; and a switch member that switches the lead between an engageable state in which the engaged section is engageable with the engaging section, and an unengageable state in which the engaged section is unengageable with the engaging section. The engageable state limits a rotational range of the rotational member within a range terminated at an engaging position where the engaging section engages with the engaged section, to restrict an unreeling range of the lead based on the rotational range (that is, the length of the unreeled lead can be selected from among plural length).

In the lead storage apparatus of the present invention, the rotational member rotating with the reel has the engaged section, and the engaging member having the engaging section engageable with the engaged section is disposed at the predetermined circumferential position with respect to the rotational member.

Further, in the lead storage apparatus of the present invention, the switch member can switch the lead between the engageable state in which the engaged section is engageable with the engaging section, and the unengageable state in which the engaged section is unengageable with the engaging section, and the engageable state can limit the unreeling lunge of the lead.

That is, in the lead storage apparatus of the present invention, the switch member switches the lead between the engageable state and the unengageable state, thereby adjusting (selecting) the lead unreeling range.

Preferably, the lead storage apparatus of the present invention further includes an intermediate rotational member that rotates with rotation of the reel, and transmits the rotation of the reel to the rotational member.

In the lead storage apparatus of the present invention, rotation of the reel transmitted to the rotational member through the intermediate rotational member. Providing the intermediate rotational member can appropriately set the number of rotations of the reel while the rotational member rotates and reaches the engaged position.

Therefore, the present invention can suppress limitations in the diameter of the reel and the rotational member, achieving miniaturization of the reel, the rotational member, and the entire lead storage apparatus.

Preferably, in the lead storage apparatus of the present invention, the engaging member includes a locking claw that operates integrally with the engaging section, and the reel is provided with a plurality of locking teeth along a circumference of its side face, the locking teeth being engageable with the locking claw. When the engaging section engages with the engaged section, the locking claw engages with the locking teeth to restrict rotation of the reel.

In the lead storage apparatus of the present invention, when the engaging section engages with the engaged section, the locking teeth formed on the reel also engage with the locking claw. Such engagement between the locking teeth and the locking claw can suppress rotation of the reel more reliably.

This can reduce a torque load exerted on the engaged section, suppressing a damage of the rotational member. With the above-mentioned configuration, because rotation of the reel can be directly restricted, even when a relatively large external force is applied to unreeling of the lead, rotation of the reel in the normal direction can be limited more reliably.

The lead storage apparatus of the present invention may thither include a locking member that can lock the locking teeth or the rotational member.

A brake mechanism and a lock fraction can be added to the lead storage apparatus by providing the member capable of contacting the locking teeth or the rotational member to restrict rotation of the reel in this manner, in addition to the engaging member. That is, in spite of the length of the unreeled lead, various functions, including emergency stop of lead unreeling, locking of lead unreeling, and so on, can be added according to the user's needs.

Advantages of the Invention

The present invention provides a lead storage apparatus capable of selecting a lead unreeling range in which the lead can be unreeled and reeled by a user's operation.

BRIEF DESCRIPTION OF THE DRAWINGS

FIG. 3 is an exploded perspective view illustrating the lead storage apparatus in FIG. 1.

FIG. 4(a) is a perspective view illustrating the top face of the case, and FIG. 4(b) is a perspective view illustrating the bottom face of the case.

FIG. 5(a) is a plan view of the reel, FIG. 5(b) is a front view of the reel, and FIG. 5(c) is a bottom view of the reel.

FIG. 6(a) illustrates the switch gear, FIG. 6(b) illustrates the intermediate gear, and FIG. 6(c) illustrates the driving gear.

FIG. 7 is an exploded perspective view illustrating the gear mechanism and the switch member in FIG. 6.

FIG. 8(a) is a perspective view of the intermediate switch, FIG. 8(b) is a plan view of the intermediate switch, and FIG. 8(c) is a front view of the intermediate switch.

FIG. 9(a) is a perspective view of a top face of the switch member. FIG. 9(b) is a perspective view of a bottom face of the switch member, FIG. 9(c) is a plan view of the switch member, and FIG. 9(d) is a front view of the switch member.

FIG. 10(a) illustrates a braking state, and FIG. 10(b) illustrates a non-braking state.

FIG. 12(a), FIG. 12(b), FIG. 12(c-1), FIG. 12(c-2), FIG. 12(c-3). FIG. 12(d-1), FIG. 12(d-2) and FIG. 12(d-3) are views illustrating positional relationship among the engaging section, the engaged section, the locking claw, and the locking teeth in the lead storage apparatus in FIG. 1 in the case of selecting an intermediate free range.

FIG. 14(a) illustrates the case of selecting the maximum free range, and FIG. 14(b) illustrates the case of selecting the intermediate free range.

MODE FOR CARRYING OUT THE INVENTION

Figure 1:
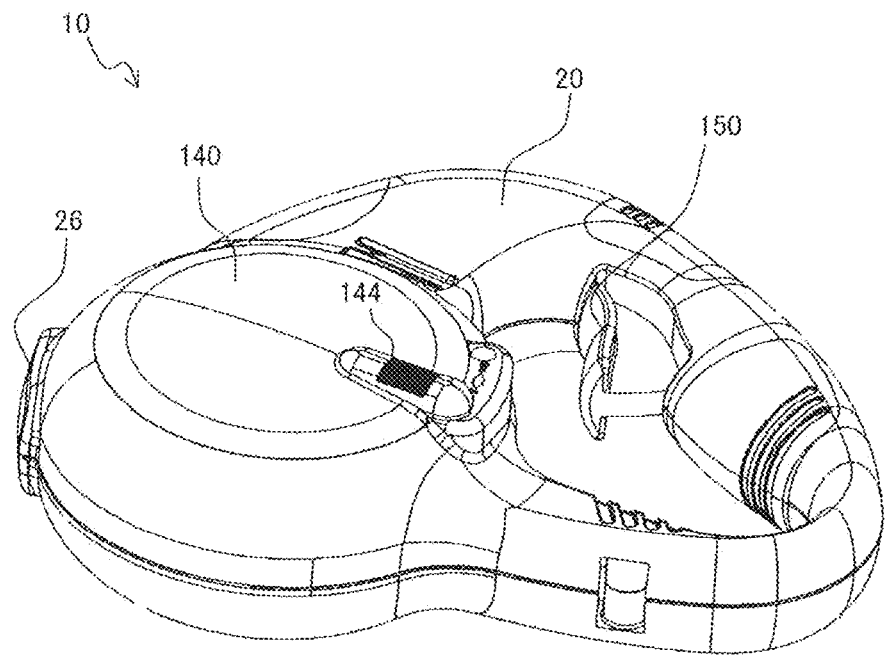
FIG. 1 is a perspective view illustrating outward appearance of a lead storage apparatus according to the present invention.
Figure 2:
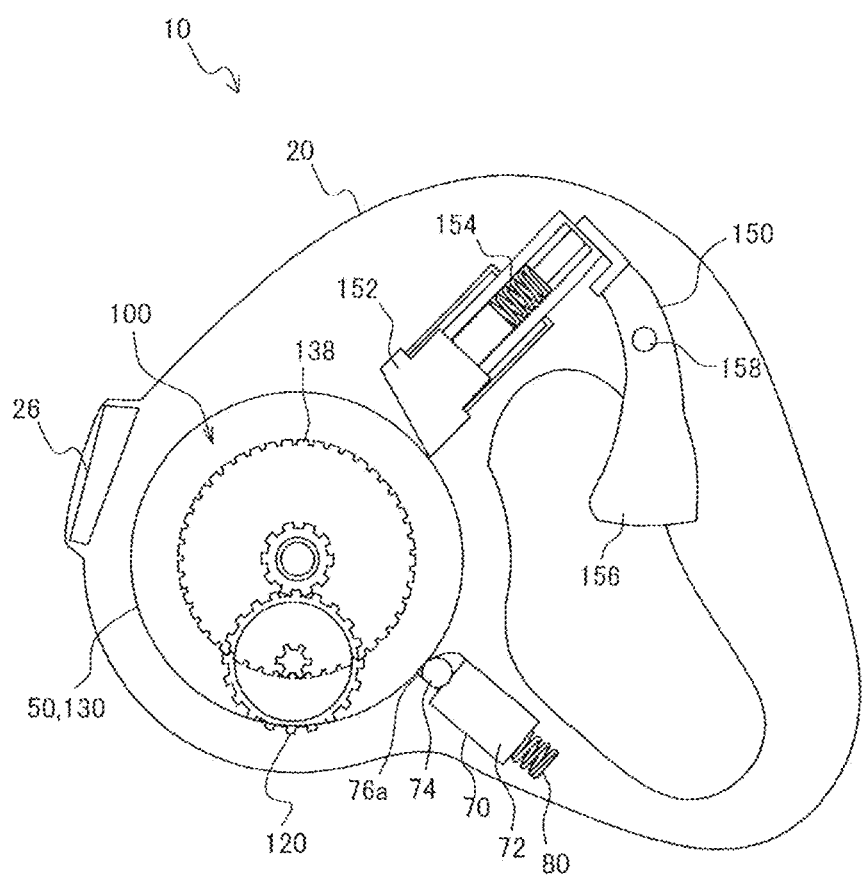
FIG. 2 is a schematic view illustrating structure of the lead storage apparatus in FIG. 1.

A lead storage apparatus 10 in accordance with an embodiment of the present invention will be described below with reference to figures. The lead storage apparatus 10 has outward appearance as illustrated in FIG. 1. As schematically illustrated in FIG. 1 and FIG. 2, the lead storage apparatus 10 includes a reel 50, an intermediate switch 70, a rotational member 130, an intermediate gear 120 (intermediate rotational member), a switch member 140, and a brake 150. In the lead storage apparatus 10, a lead 2 is wound around a reeling section 52 of the reel 50, and is taken in and out through a lead unreeling section 26 formed on a case 20.

The lead storage apparatus 10 can rotate the reel 50 in a lead unreeling direction (normal direction) by an external force to pull the lead 2 in the unreeling direction, thereby unreeling the lead 2. During the unreeling of the lead 2, the lead storage apparatus 10 can store a biasing force in a below-mentioned coil spring (not illustrated), and rotate the reel 50 in a lead reeling direction (reverse direction) by the stored biasing force, thereby reeling the lead 2.

As described above, the lead storage apparatus 10 has a lead unreeling range (free range) in which unreeling of the lead 2 and reeling of the lead 2 by the biasing force are allowed. As described later, the lead storage apparatus 10 can set the lead unreeling range (free range) to a maximum range corresponding to the whole length of the lead 2 (maximum free range) and an intermediate range that is smaller than the maximum free range (intermediate free range).

Next, configuration of each section of the lead storage apparatus 10 will be described in detail. As illustrated in FIG. 2 and FIG. 4, the lead storage apparatus 10 includes the case 20 that stores each mechanism and so on. The case 20 is provided with a reel storage section 22, a grip 24, and the lead unreeling section 26.

The reel storage section 22 serves to store the reel 50 and a gear mechanism 100. The grip 24 is a handle held by a user P of the lead storage apparatus 10. The lead unreeling section 26 serves to take the lead 2 into and out of the case 20.

Figure 4A:
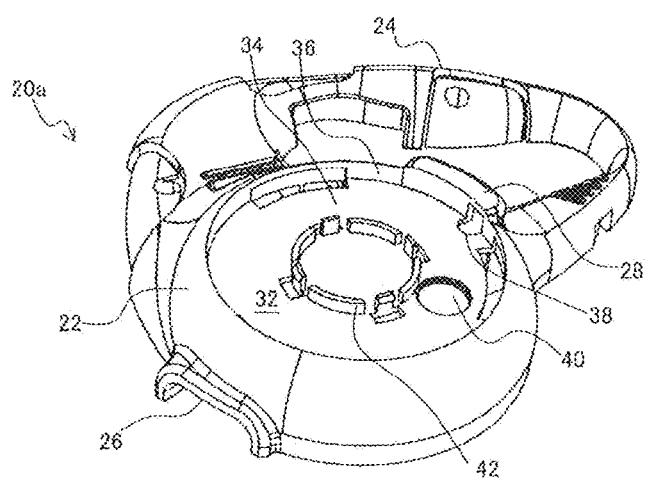
FIG. 4(a) and FIG. 4(b) are perspective views illustrating a case of the lead storage apparatus in FIG. 1.
Figure 4B:
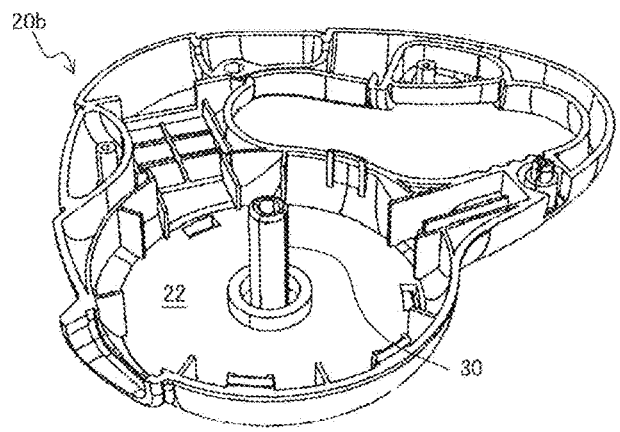

The case 20 includes a first case piece 20a illustrated in FIG. 4(a) and a second case piece 20b illustrated in FIG. 4(b). The two pieces are combined to each other to form space that is the reel storage section 22 in the case 20.

In the first case piece 20a, a substantially circular switch-member storage area 32 dented inward is provided on the outer side of the reel storage section 22. The switch-member storage area 32 includes a partition wall 34 that forms a boundary with the reel storage section 22, and a circumferential face 36. The partition wall 34 has an intermediate-gear protrusion hole 40 that penetrates the case 20.

The circumferential face 36 has an engaging-section protrusion hole 38. A free-range display section 28 is provided adjacent to the engaging-section protrusion hole 38 on the outer side of the switch-member storage area 32.

As illustrated in FIG. 4(b), a reel support shaft 30 is provided on the bottom face of the reel storage section 22. The reel support shaft 30 rotatably supports the reel 50 in the case 20.

Figure 5A:
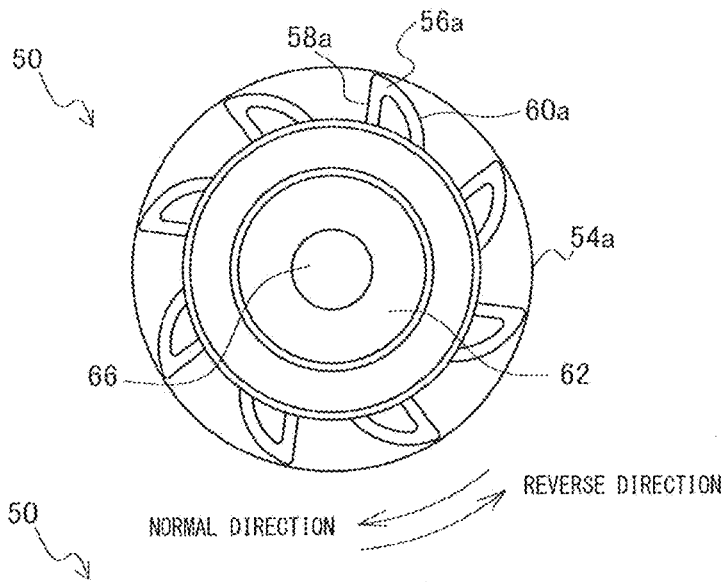
FIG. 5(a), FIG. 5(b) and FIG. 5(c) are views illustrating a reel of the lead storage apparatus in FIG. 1.
Figure 5B:
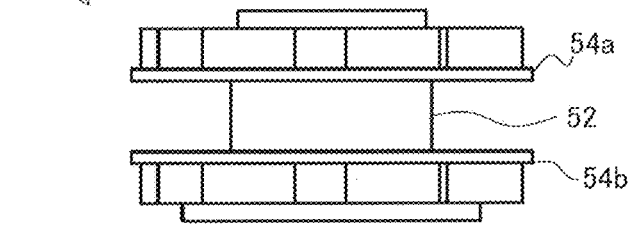

As illustrated in FIG. 5, the reel 50 includes the reeling section 52 and flanges 54a, 54b. The reel 50 is stored in the reel storage section 22 of the case 20 such that the flange 54a faces the first case piece 20a and the flange 54b faces the second case piece 20h.

The reeling section 52 is a tuboid member that can reel the lead 2 and has a shaft through-hole 66 for passing the reel support shaft 30 therethrough. The reeling section 52 includes a coil spring (biasing means) not illustrated.

Thus, when an external force to pull the lead 2 out of the case 20 is applied, a biasing force is stored in the coil spring (not illustrated). As the external force to pull out the lead 2 decreases, the reel 50 is rotated in the direction opposite to the direction of pulling the lead 2 by the biasing force stored in the coil spring, to reel the lead 2.

Figure 5C:
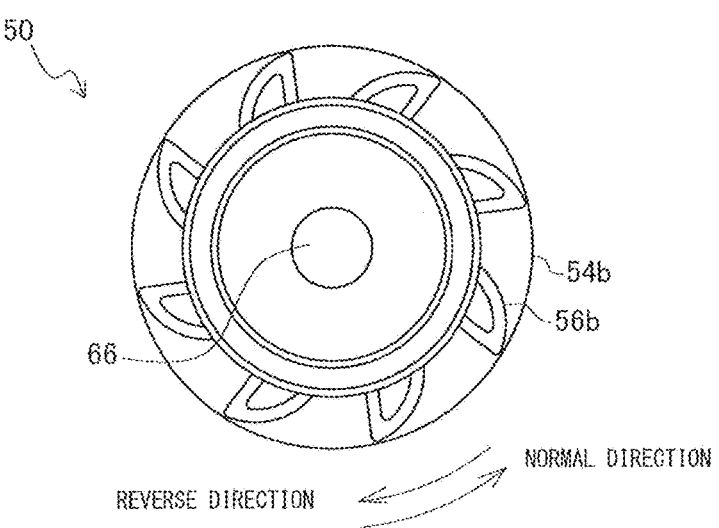

As illustrated in FIG. 5(a) and FIG. 5(c), flanges 54a. 54b are provided with a plurality of (eight in this embodiment) claw-like locking teeth 56a, 56b radially extending from the rotational center of the reel 50, respectively. The locking teeth 56a, 56b have respective sliding faces 60a, 60b located on the front side in the normal rotating direction of the reel 50, and respective locking faces 58a, 58b located on the rear side in the normal rotating direction of the reel 50.

The sliding faces 60a, 60b are curved in plan view. Specifically, the sliding faces 60a, 60b are curved from the rotational center of the reel 50 rearward in the normal rotating direction of the reel 50. Meanwhile the locking faces 58a, 58b linearly extend from the rotational center of the reel 50 to the radial outer side.

As illustrated in FIG. 5(a), the flange 54a has a driving-gear storage section 62. The driving-gear storage section 62 stores a below-mentioned driving gear 110. The driving gear 110 is fixed to the driving-gear storage section 62. The driving gear 110 may be fixed to the driving-gear storage section 62 in various ways. For example, a protrusion on the outer circumference of the driving gear 110 may engage with a recess on the inner circumference of the driving-gear storage section 62.

The gear mechanism 100 serves to rotate with rotation of the feel 50 switch the free range. The gear mechanism 100 includes the driving gear 110 fixed to the reel 50, the intermediate gear 120 (intermediate rotational member) that transmits rotation of the driving gear 110, and the rotational member 130 (rotational member) that rotates with rotation of the intermediate gear 120.

As illustrated in FIG. 7, the driving gear 110 and the intermediate gear 120 are stored inside the reel storage section 22. The rotational member 130 is provided in the switch-member storage area 32 formed outside the reel storage section 22 via the partition wall 34. The intermediate gear 120 partially protrudes from the reel storage section 22 toward the switch-member storage area 32 through the intermediate-gear protrusion hole 40 in the partition wall 34, and engages with the rotational member 130.

Next, the gears constituting the gear mechanism 100 will be described with reference to figures. FIG. 6 illustrate the driving gear 110, the intermediate gear 120, and the rotational member 130, which constitute the gear mechanism 100, in plan and front views.

Figure 6A:
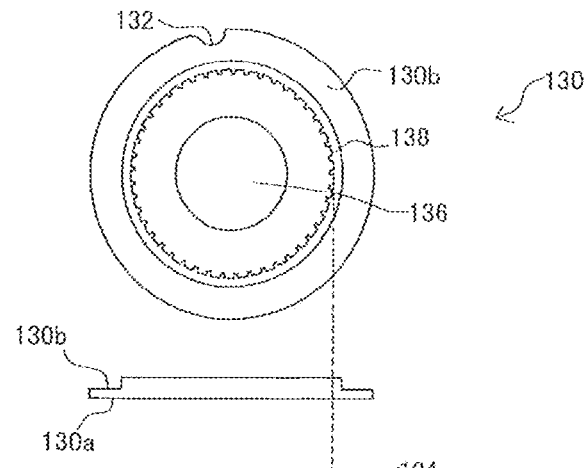
FIG. 6(a), FIG. 6(b) and FIG. 6(c) are views illustrating gears constituting a gear mechanism of the lead storage apparatus in FIG. 1.
Figure 6B:
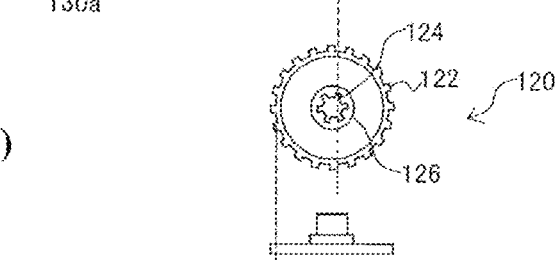
Figure 6C:
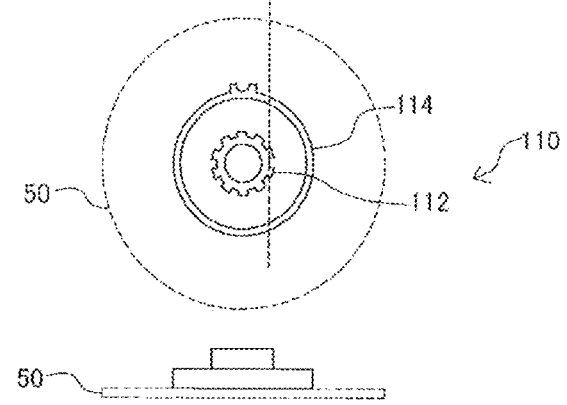

As illustrated in FIG. 6(c), the driving gear 110 includes a fixing section 114 for fixation to the reel 50, and an intermediate-gear meshing section 112. The driving gear 110 rotates with rotation of the reel 50, with the fixing section 114 being fixedly stored in the driving-gear storage section 62 of the reel 50.

As illustrated in FIG. 6(b), the intermediate gear 120 includes a driving-gear meshing section 122, a switch-gear meshing section 124, and a partition-wall fitting section 126. The driving-gear meshing section 122 meshes with the intermediate-gear meshing section 112 of the driving gear 110. Thus, rotation of the driving gear 110 is transmitted to the intermediate gear 120 to rotate the intermediate gear 120.

As illustrated in FIG. 7, in the intermediate gear 120, the partition-wall fitting section 126 is fitted in the intermediate-gear protrusion hole 40 of the partition wall 34, and the switch-gear meshing section 124 protrudes toward the switch-member storage area 32.

The rotational member 130 acts to rotate with rotation of the reel 50, and switch the free range according to the engaging state with an engaging section 74 described later in detail. The rotational member 130 is a disc-like member having the substantially same outer diameter as an inner diameter of the switch-member storage area 32 of the case 20, and is rotatably fitted in the switch-member storage area 32, with a front face 130a facing the outside of the lead storage apparatus 10, and a back face 130b facing the partition wall 34.

As illustrated in FIG. 6(a), an intermediate-gear meshing section 138 is formed on the back face 130b of the rotational member 130. The intermediate-gear meshing section 138 meshes with the switch-gear meshing section 124 of the intermediate gear 120. For this reason, the rotational member 130 receives the rotational force of the reel 50 via the intermediate gear 120, and rotates in the switch-member storage area 32.

An engaged section 132 is formed on the outer circumference of the rotational member 130. The engaged section 132 is dented inward from the radial outer side toward the radial inner side of the rotational member 130. The engaged section 132 can engage with the engaging section 74 of the intermediate switch 70.

Figure 8A:
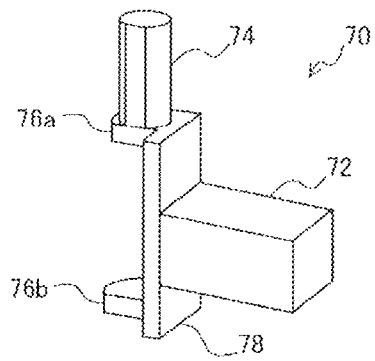
FIG. 8(a), FIG. 8(b) and FIG. 8(c) are views illustrating an intermediate switch of the lead storage apparatus in FIG. 1.
Figure 8B:
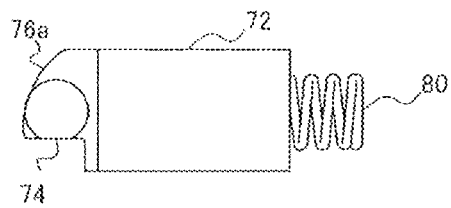
Figure 8C:
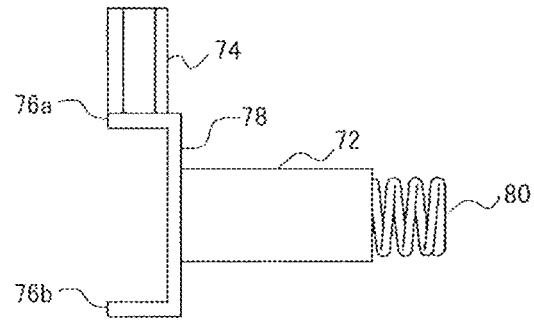
Figure 9A:
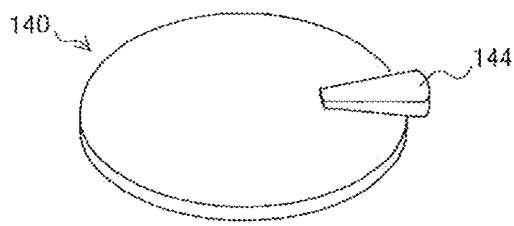
FIG. 9(a), FIG. 9(b), FIG. 9(c) and FIG. 9(d) are views illustrating a switch member of the lead storage apparatus in FIG. 1.
Figure 9B:
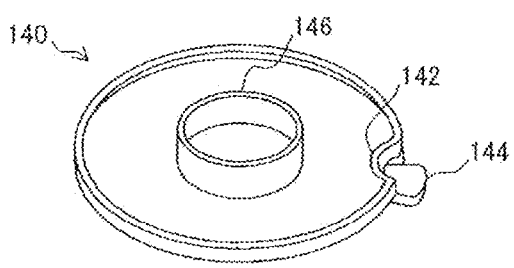
Figure 9C:
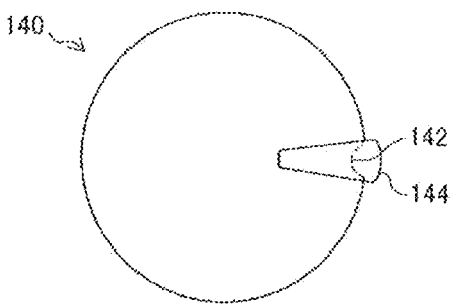
Figure 9D:
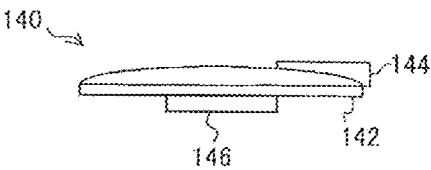

As illustrated in FIG. 2, the intermediate switch 70 (engaged member) is adjacent to the rotational member 130 at a predetermined circumferential position on the radial outer face of the rotational member 130. As illustrated in FIG. 8, a support section 72, the engaging section 74, locking claws 76a, 76b, and a locking-claw coupling section 78 are integrated into the intermediate switch 70.

The intermediate switch 70 has the locking-claw coupling section 78 extending to cross the columnar support section 72, and the locking claws 76a, 76b are provided at respective ends of the locking-claw coupling section 78. A substantially cylindrical engaging section 74 is vertically mounted on the locking claw 76a.

As illustrated in FIG. 2 and other figures, the intermediate switch 70 is stored in an area from the grip 24 to the reel storage section 22 in the case 20. The intermediate switch 70 is biased from the grip 24 toward the reel 50 by a coil spring 80 attached to an end of the support section 72 opposite to the locking-claw coupling section 78. That is, the engaging section 74 is biased to protrude from the engaging-section protrusion hole 38 of the case 20 toward the switch-member storage area 32.

Thus, when the rotational member 130 fitted in the switch-member storage area 32 rotates to put the engaged section 132 adjacent to the engaging-section protrusion hole 38, the engaging section 74 protrudes from the engaging section protrusion hole 38, and enters into and engages with the engaged section 132. The intermediate switch 70 slides to the reel 50.

The intermediate switch 70 is attached to the case 20 such that the locking claws 76a, 76b face the reel 50. When the intermediate switch 70 slides to the reel 50 as described above, the locking claws 76a, 76b also move toward the reel 50. In this connection, the locking claws 76a, 76b move to be engageable with the locking teeth 56a, 56b, respectively. Engaging the locking claws 76a, 76b with the locking teeth 56a, 56b restricts rotation of the reel 50.

The switch member 140 serves to switch the lead between the state where the engaging section 74 is prohibited from entering into the engaged section 132 (unengageable state) and the state where the engaging section 74 is allowed to enter into the engaged section 132 (engagable state). As illustrated in FIG. 9, the switch member 140 is substantially circular, and has a substantially same outer diameter as that of the rotational member 130.

The switch member 140 includes a recess 142, a guide 144, and an attachment section 146. The recess 142 is provided on the outer edge of the switch member 140 so as to be dented inward from its outer circumference. The guide 144 serves to guide the user P of the lead storage apparatus 10 to rotate the switch member 140, and is located corresponding to the recess 142.

The switch member 140 is attached to the rotational member 130 to cover the lead storage apparatus 10 by fitting the attachment section 146 into a switch-member fitting section 42 of the partition wall 34. The switch member 140 rotates under the guide of the guide 144, while making its side surface into contact with the circumferential face 36 of the switch-member storage area 32.

When the engaged section 132 becomes adjacent to the engaging-section protrusion hole 38 as described above, there generates an area into which the engaging section 74 can enter. Consequently, when the engaging-section protrusion hole 38 communicates with the recess 142 in the state where the guide 144 aligns with a position displayed as "Intermediate" in the free-range display section 28 (intermediate free display area 46), the engaging section 74 can enter into the above-mentioned area into which the engaging section 74 can enter.

When the guide 144 aligns with a position displayed as "Maximum" away from the intermediate free display area 46 (maximum free area 44), the outer edge of the switch member 140 prevents the engaging section 74 from entering into the area into which the engaging section 74 can enter.

Next, arrangement of the gear mechanism 100 and the switch member 140 will be described with reference to figures. FIG. 7 is an exploded perspective view illustrating the gear mechanism 100 and the switch member 140. As described above, the rotational member 130 rotates with rotation of the reel 50.

When the lead 2 is unreeled and the reel 50 rotates in the normal direction (counterclockwise in FIG. 7), the intermediate gear 120 receives the rotational force through the driving gear 110, and rotates in the opposite direction to the rotating direction of the driving gear 110 (clockwise in FIG. 7). The rotational member 130 receives the rotational force on the intermediate-gear meshing section 138 through the intermediate gear 120, and rotates in the same direction as the rotating direction of the intermediate gear 120 (clockwise in FIG. 7).

As described above, the rotational member 130 receives rotation of the reel 50, and rotates in the same direction as the rotating direction of the reel 50. On the contrary, the switch member 140 does not rotate with rotation of the rotational member 130, and rotates under guide of the guide 144 operated by the user P.

Figure 10A:
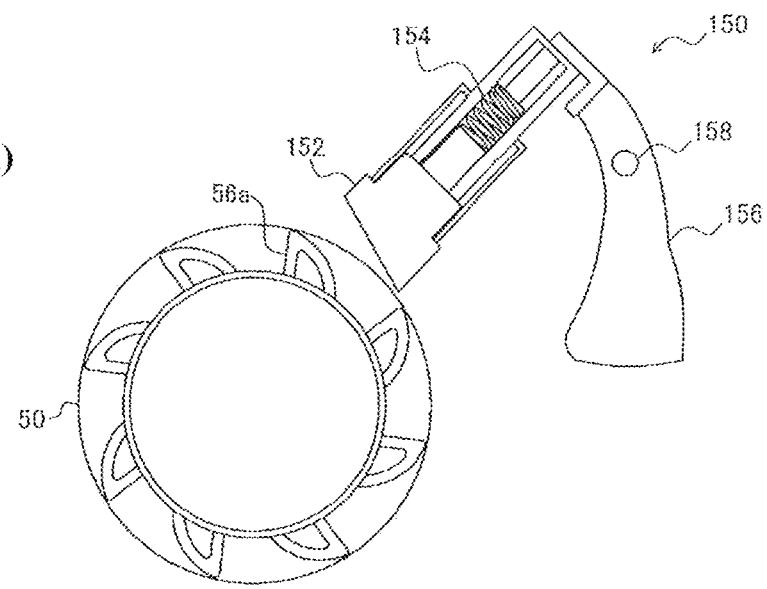
FIG. 10(a) and FIG. 10(b) are views illustrating a brake of the lead storage apparatus in FIG. 1.
Figure 10B:
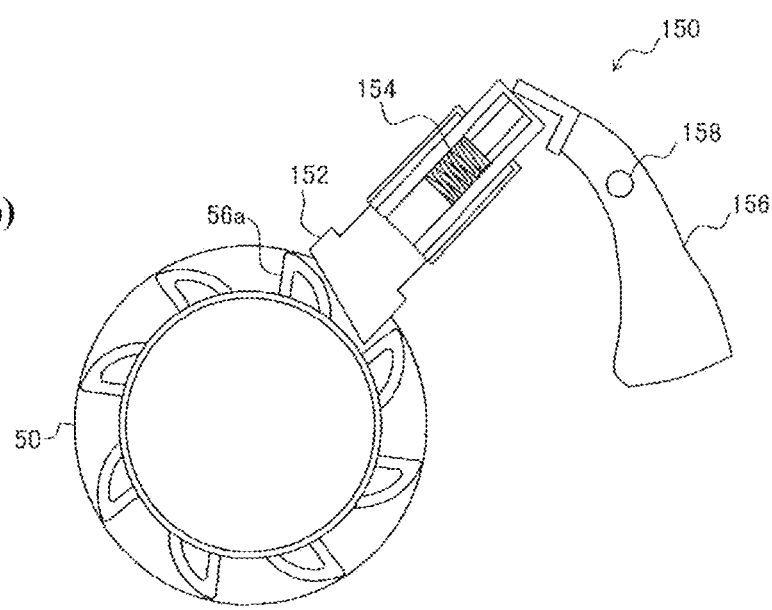

The brake 150 serves to prohibit the reel 50 from rotating in both of the normal direction and the reverse direction to keep unreeling of the lead 2 a predetermined distance. As illustrated in FIG. 10, the brake 150 includes a locking member 152, a compression spring 154, and an operating section 156. The locking member 152 is stored in the grip 24, is biased in the direction away from the reel 50 by the compression spring 154. The operating section 156 is swingable about a swinging fulcrum 158 fixed to the case 20.

As illustrated in FIG. 1 and FIG. 2, the operating section 156 partially protrudes outward from the grip 24. When the user grips the portion of the operating section 156, which protrudes from the grip 24, the operating section 156 swings about the swinging fulcrum 158, and the locking member 152 slides toward the reel 50 against the biasing force of the compression spring 154. Accordingly, the locking member 152 engages with the locking teeth 56a, 56b of the reel 50, prohibiting the reel 50 from rotating in the normal direction and the reverse direction, that is, locking rotation of the reel 50.

Next, switching of the free range of the lead storage apparatus 10 between a maximum unreeling range of the lead 2 (maximum free range) and an intermediate unreeling range (intermediate free range) will be described with reference to figures.

<Selection of Maximum Free Range>

Figure 11A:
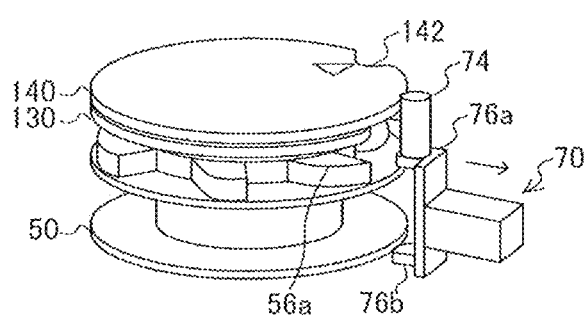
FIG. 11(a), FIG. 11(b) and FIG. 11(c) are views illustrating positional relationship among an engaging section, an engaged section, a locking claw, and locking teeth of the lead storage apparatus in FIG. 1 in the case of selecting a maximum free range.

FIG. 11 illustrate positional relationship among the switch member 140, the rotational member 130, and the reel 50 in the case of selecting the maximum free range. FIG. 11 do not illustrate the driving, gear 110, the intermediate gear 120, and the partition wall 34. FIG. 11(a) is a perspective view illustrating the switch member 140, the rotational member 130, the reel 50, and the intermediate switch 70 in the case of selecting the maximum free range.

Figure 11B:
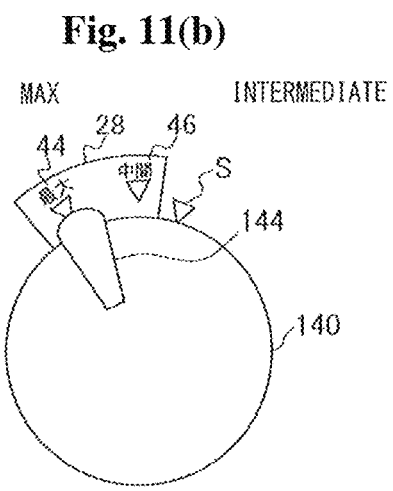

FIGS. 11(a) and 11(b) illustrate an initial state (prior to unreeling of the lead 2). In the initial state, the engaged section 132 of the rotational member 130 is adjacent to a start position S in the figure. As the lead 2 is unreeled, the rotational member 130 rotates with rotation of the reel 50. Accordingly, the rotational member 130 rotates clockwise from the start position S, and the engaged section 132 reaches the engaging-section protrusion hole 38.

Figure 11C:
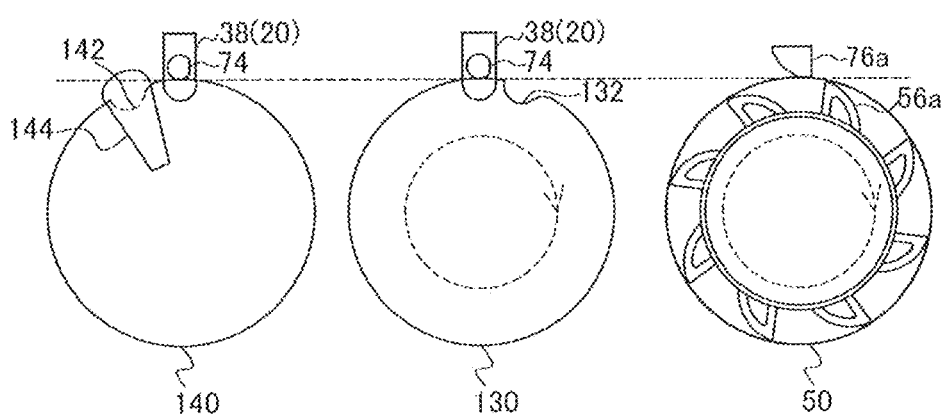

Here, when the guide 144 of the switch member 140 aligns with the position displayed as "Maximum" of the free-range display section 28 of the case 20 as illustrated in FIG. 11(b), the engaging section 74 is restricted by the outer edge of the switch member 140 as illustrated in FIG. 11(c) and thus, prevented from protruding from the engaging-section protrusion hole 38.

For this reason, even when the rotational member 130 rotates such that the engaged section 132 is adjacent to the engaging-section protrusion hole 38, the engaging section 74 does not engage with the engaged section 132. Similarly, the locking claws 76a, 76b moving integrally with the engaging section 74 do not move toward the reel 50, and the locking claws 76a, 76b do not engage with the locking teeth 56a, 56b. Therefore, in the state where the guide 111 aligns with the position displayed as "Maximum" of the free-range display section 28, the maximum unreeling range corresponds to the substantially whole length of the lead 2, and the lead 2 can be reeled and unreeled within the range.

<Selection of Intermediate Free Range>

Next, the case of setting the free range to a predetermined intermediate distance in the maximum unreeling range of the lead 2 (intermediate free range) will be described with reference to figures. FIG. 12 illustrate positional relationship among the switch member 140, the rotational member 130, and the reel 50 in the case of setting the intermediate distance to the free range (intermediate free range).

Like FIG. 11, FIG. 12 do not illustrate the driving gear 110, the intermediate gear 120, and the partition wall 34. FIG. 12(a) is a perspective view illustrating the switch member 140, the rotational member 130, the reel 50 and the intermediate switch 70 in the case of selecting the intermediate free range.

As illustrated in FIG. 12(b), when the guide 144 of the switch member 140 aligns with the position displayed as "Intermediate" of the free-range display section 28, the recess 142 is located adjacent to the engaging-section protrusion hole 38, and the engaging section 74 can enter into the engaged section 132 of the switch gear 130.

When the lead 2 is unreeled in this state, the rotational member 130 rotates with rotation of the reel 50. Then, when the engaged section 132 reaches the engaging-section protrusion hole 38, the engaging section 74 of the intermediate switch 70 enters into the recess 142 and the engaging-section protrusion hole 38 and engages therewith. Like the engaging section 74, the locking claw 76a, 76b move toward the reel 50, and engage with the locking teeth 56a, 56b, respectively.

Figure 13A:
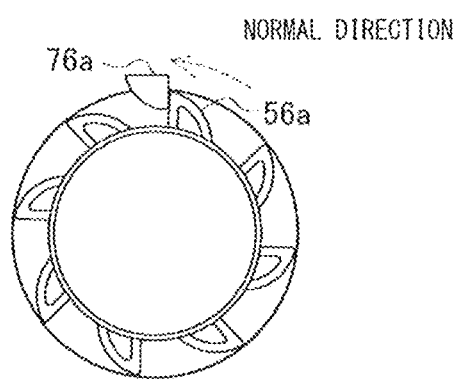
FIG. 13(a), FIG. 13(b) and FIG. 13(c) are views illustrating motion of the locking teeth and the locking claw in the engaged state illustrated in FIG. 12.
Figure 13B:
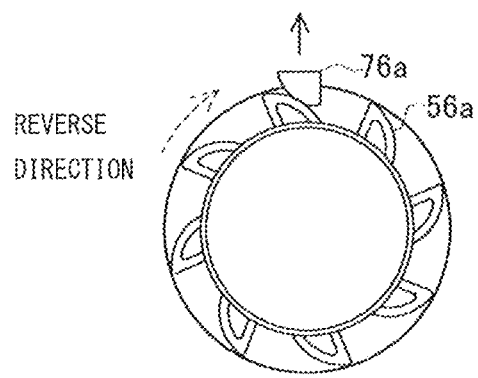
Figure 13C:
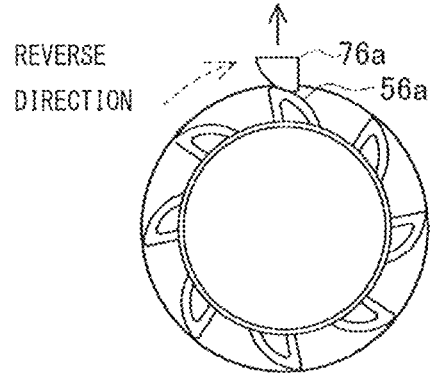

Here, when the engaged section 132 reaches the position where it can engage with the engaging section 74 as illustrated in FIG. 13, the locking claws 76a, 76b make contact with the locking teeth 56a, 56b, respectively. Even when an external force to unreel the lead 2 is applied in this state, the clocking claw 76a is in contact with the locking tooth 56a, preventing the reel 50 from further rotating in the normal direction.

On the contrary, when the reel 50 rotates in the reverse direction as illustrated in FIG. 13(b), the locking claw 76a makes contact with the smooth curved side face of the locking tooth 56a. In this case, a force to reel the reel 50 is transmitted to the driving gear 110, the intermediate gear 120, and the rotational member 130, pushing back the intermediate switch 70 at an R-shaped portion of the engaged section 132. This allows rotation of the reel 50, enabling reeling of the lead 2.

Consequently, when the guide 144 aligns with the position displayed as "Intermediate", the unreeling range of the lead 2 becomes less than the substantially whole length of the lead 2, and the lead 2 can be reeled and unreeled in this range.

Figure 14A:
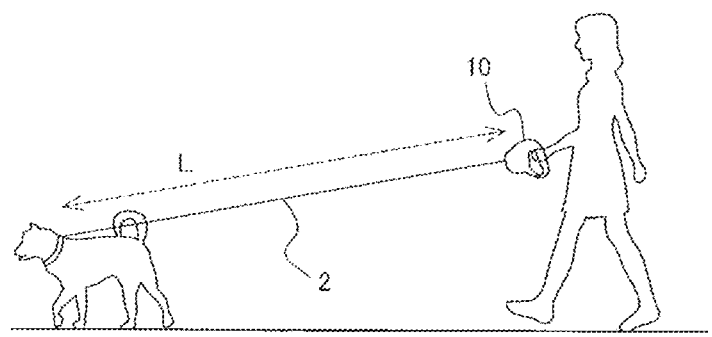
FIG. 14(a) and FIG. 14(b) are imaginary views illustrating an user who takes a walk with a pet using the lead storage apparatus in FIG. 1.
Figure 14B:
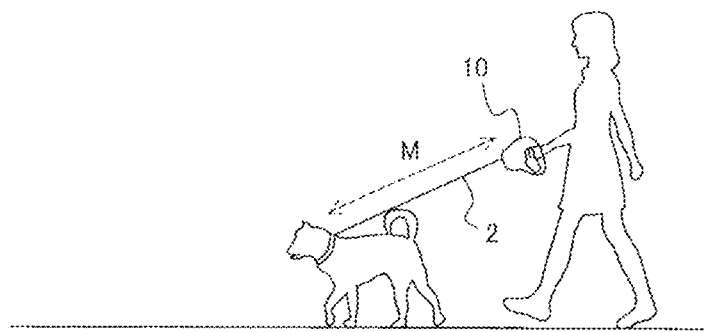

FIG. 14 illustrate usage of the lead storage apparatus 10 for walking of a pet such as a dog. FIG. 14(a) illustrates the case of the maximum free range, and FIG. 14(b) illustrates the case of the intermediate free range. As illustrated in FIG. 14(a), when the maximum free range is selected, the lead 2 can be unreeled and reeled in a range L while allowing the pet to move in the unreeling range L of the lead 2.

When the intermediate free range is selected as illustrated in FIG. 14(b), activity of the pet is limited in an unreeling range M of the lead 2. Also in this case, the lead 2 can be unreeled and reeled in the range M. Braking is enabled in the both ranges.

As described above, in this embodiment, the reel 50 has the locking teeth 56a, 56b, and engaging the locking claws 76a, 76b) with the locking teeth 56a, 56b prohibits rotation of the reel 50. However, the lead storage apparatus of the present invention is not limited to this embodiment. That is, in place of providing the locking teeth 56a, 56b on the reel 50, engaging the engaging section 74 with the engaged section 132 may prevent rotation of the rotational member 130 to prohibit rotation of the reel 50.

Although the switch member 140 is provided on one side face of the case 20 in this embodiment, the switch member 140 may be also provided on the bottom face of the case 20 to make three or more free ranges available.

Although the lead storage apparatus 10 includes the brake 150 in this embodiment, any suitable mechanism for locking the position of the locking member 152 may be added. Using such lock mechanism in the lead storage apparatus 10 can keep the length of the lead 2 according to the preference of the user P during walking of a pet.

Although the typical embodiment of the lead storage apparatus according to the present invention has been described above, the present invention is not limited to this embodiment. That is, the embodiment can be modified in any manner within the technical scope of the present invention recited in CLAIMS, and all of the modifications shall fall within the scope of the present invention.

INDUSTRIAL APPLICABILITY

The lead storage apparatus of the present invention can be suitably used as a lead storage apparatus capable of reeling and unreeling a pulling cord such as a lead for pet.

DESCRIPTION OF REFERENCE SIGNS

2: Lead
10: Lead storage apparatus.
50: Reel
54a, 54b: Flange
56a, 56b: Locking tooth
70: Intermediate switch (engaging member)
74: Engaging section
76a. 76b: Locking claw
120: Intermediate gear (intermediate rotational member)
130: Switch gear (rotational member)
132: Engaged section
140: Switch member
152: Locking member

The invention claimed is:
1. A lead storage apparatus for storing a lead for an animal such as a pet, the apparatus comprising:
a reel configured to rotate in a normal direction to unreel the lead, and to rotate in a reverse direction to reel the lead;
a biasing member configured to receive an external force caused by unreeling of the lead and store a biasing force, and upon release of the external force, to bias rotation of the reel in the reverse direction;
a rotational member including an engaged section on a circumference, the rotational member being configured to rotate with the reel;
an engaging member including an engaging section engageable with the engaged section, the engaging member being disposed at a predetermined circumferential position with respect to the rotational member;
a switch member configured to switch the lead between an engageable state in which the engaged section is engageable with the engaging section, and an unengageable state in which the engaged section is unengageable with the engaging section; and
an intermediate rotational member configured to rotate with rotation of the reel, and to transmit the rotation of the reel to the rotational member, wherein the engageable state limits a rotational range of the rotational member within a range terminated at an engaging position where the engaging section engages with the engaged section, to restrict an unreeling range of the lead based on the rotational range, the switch member is circular and has a same outer diameter as that of the reel and the rotational member, and the reel and the rotational member are coaxial, and the intermediate rotational member is not coaxial with the reel and the rotational member.

2. The lead storage apparatus according to claim 1, wherein the engaging member includes a locking claw configured to operate integrally with the engaging section, the reel is provided with a plurality of locking teeth along a circumference of a side face, the locking teeth being engageable with the locking claw, and when the engaging section engages with the engaged section, the locking claw engages with the locking teeth to restrict rotation of the reel.

3. The lead storage apparatus according to claim 1, further comprising a locking member configured to lock a locking teeth or the rotational member.

* * * * *